United States Patent [19]

Trexler

[11] 4,026,286
[45] May 31, 1977

[54] ISOLATORS

[75] Inventor: Philip Charles Trexler, Sindlesham, England

[73] Assignee: National Research Development Corporation, London, England

[22] Filed: May 25, 1976

[21] Appl. No.: 689,868

[30] Foreign Application Priority Data

May 29, 1975 United Kingdom ............. 23470/75

[52] U.S. Cl. ............................... 128/204; 128/1 B; 312/3; 52/2
[51] Int. Cl.² ........................................ A61M 16/02
[58] Field of Search .......... 128/204, 1 B, 1 R, 297, 128/298, 191 A; 312/1 R, 3 R; 52/2 R

[56] References Cited

UNITED STATES PATENTS

| 3,254,457 | 6/1966 | Gedney | 52/2 R |
| 3,272,199 | 9/1966 | Mathews | 128/1 R |
| 3,501,213 | 3/1970 | Trexler | 128/1 R |
| 3,907,389 | 9/1975 | Cox et al. | 128/1 B |

FOREIGN PATENTS OR APPLICATIONS

| 2,335,329 | 2/1974 | Germany | 128/1 B |
| 1,146,767 | 3/1969 | United Kingdom | 312/1 R |

Primary Examiner—Robert W. Michell
Assistant Examiner—Henry J. Recla
Attorney, Agent, or Firm—Cushman, Darby & Cushman

[57] ABSTRACT

An enclosure member such as a medical isolator provides an isolated environment at a higher pressure than the ambient environment, and has a transfer port for passage of objects into and out of the enclosure member. The transfer port comprises a flexible sleeve having one end coupled to the enclosure member around an opening in the enclosure member and having its other end positioned externally of the enclosure member. An air permeable member is arranged across the opening in the enclosure member and passes a restricted, substantially non-turbulent flow of air along the sleeve. The air permeable member is movable away from the opening during passage of objects through the conduit, and may comprise a sheet of flexible material hanging in the form of a curtain across the opening. Preferably the cross-sectional area of the sleeve diminishes with increase of distance along the sleeve away from the opening of the enclosure member to produce an increasing air velocity along the sleeve.

15 Claims, 11 Drawing Figures

ISOLATORS

The present invention is concerned with improvements in and relating to enclosure members for providing an environment isolated from the ambient environment.

The invention is concerned with enclosure members which have become known as isolators and which are used mainly for the handling of laboratory animals and human patients under controlled microbiological conditions in which only known microbes are present in the environment of the subject. Such conditions have become known as gnotobiotic conditions. An isolator commonly consists of a flexible transparent bag of synthetic plastics material forming an enclosure which is continuously vented with germ free air, and maintained at a small positive air pressure with respect to the ambient atmosphere. Such an isolator will normally have means for handling objects within the isolator without breaking the microbiological isolation of the isolator. The boundary of the isolator may be formed wholly or only partly by the flexible synthetic plastics material. Commonly the isolators are in disposable form, being provided presterilised for use on one occasion only.

In such as isolator, the main weakness in the isolation of the system lies in the arrangements for introducing and removing material and instruments into and from the enclosure member, as these arrangements usually involve the need to break the boundary of the environment.

It is an object of the present invention to provide improved arrangements for introducing and removing objects into and from an isolator.

According to the present invention there is provided an enclosure member for providing an environment isolated from the ambient environment and at a higher pressure than the ambient environment, the enclosure member having a transfer port for passage of objects into and out of the enclosure member, the transfer port comprising a flexible sleeve having one end coupled to the enclosure member around an opening in the enclosure member and having its other end positioned externally of the enclosure member, and an air permeable member arranged across the opening in the enclosure member for passing a restricted substantially non-turbulent flow of air along the sleeve when in operation the interior of te enclosure member is maintained at a higher pressure than the ambient environment, the air permeable member being movable away from the opening during passage of objects through the sleeve.

Preferably the transfer port includes support means for supporting the flexible sleeve in such a manner that the cross-sectional area of the sleeve diminishes with increase of distance along the sleeve away from the opening of the enclosure member throughout the entire length of the sleeve, the diminishing cross-sectional area of the sleeve being so arranged as to produce in operation an increasing air velocity along the sleeve which acts to prevent or inhibit entrainment of air back into the sleeve.

The use of the sleeve allows the straightening of eddy currents around the opening in the enclosure member, and the increasing air flow along the sleeve allows this to be achieved by a shorter length of sleeve than would be necessary for a sleeve of uniform cross-sectional area.

Preferably the air permeable member comprises a sheet of flexible material hanging in the form of a curtain across the opening. The member may comprise a sheet of flexible synthetic plastics material which is itself substantially impervious to air but which is perforated to render it air permeable.

The transfer port may include means for arranging the end of the sleeve remote from the enclosure member in at least two positions, a first of which is such that the end of the sleeve is held open for passage of objects, and a second of which is such that the end of the sleeve is substantially closed. There may be provided means for varying the cross-sectional area of the said end of the flexible sleeve so as to allow variation in the rate of loss of air from the enclosure member. Conveniently the end of the sleeve remote from the enclosure member may terminate in a pair of rods which may be placed either together in order to close the sleeve, or spaced apart by a distance such that the cross-sectional area of the sleeve diminishes along the sleeve as has been described.

In preferred arrangements according to the invention the opening in the enclosure member may be circular, although an oval or other shape may be adopted.

In accordance with another feature of the invention there is provided within the flexible sleeve a rigid platform which is supported generally clear of the walls of the sleeve. In operation, articles intended to pass through the sleeve may be placed on the platform from one end of the sleeve and may be removed from the platform from the other end of the sleeve.

In another arrangement, the free end of the sleeve remote from the enclosure member may be positioned at a higher level than the opening in the enclosure member, the axis of the sleeve being arranged with a substantially uniform inclination to the horizontal to allow objects to be dropped or rolled into the enclosure member.

Preferably the enclosure member is a flexible walled enclosure member adapted to be inflated in use, and the enclosure member and the sleeve are made of flexible synthetic plastics material. Conveniently there may be provided a rigid frame defining the form of the said opening in the enclosure member and supporting the sleeve at the end thereof coupled to the enclosure member.

Isolators are of two main kinds namely isolators in which it is desired to exclude bacteria in the ambient surroundings from the interior of the isolator, and isolators in which it is desired to prevent bacteria within the isolator escaping into the ambient atmosphere. The first kind are known as exclusion isolators and the second kind are known as containment isolators. Exclusion isolators are normally maintained at a pressure higher than the ambient atmospheric pressure, filtered air being supplied to the interior of the isolator and being allowed to escape from a pressure valve, or otherwise. Containment isolators are normally maintained at a pressure slightly below ambient atmospheric temperature, the exhaust from the containment isolator being filtered before the air passes into the surroundings.

The enclosure member with the transfer port as set out above in accordance with the present invention is intended for use as an exclusion isolator. However it will be appreciated that if required in practice the sleeve may be removed from the rigid frame and the opening closed by a bag or other membrane, and the enclosure member may then be used as a containment isolator.

As has been mentioned, there may be provided in accordance with the invention means for varying the cross-sectional area of the flexible sleeve at its end remote from the enclosure member. As has been explained, these means for varying the cross-sectional area are primarily for reducing the cross-sectional area along the sleeve so as to ensure an air flow of increasing velocity in operation, but the means for varying the cross-sectional area also allow variation of the rate of escape of air from the enclosure member. This function allows the degree of inflation of the enclosure member to be adjusted without the need for a separate pressure valve which is normally present in isolators.

Embodiments of the invention will now be described by way of example with reference to the accompanying drawings in which.

Figure 1:
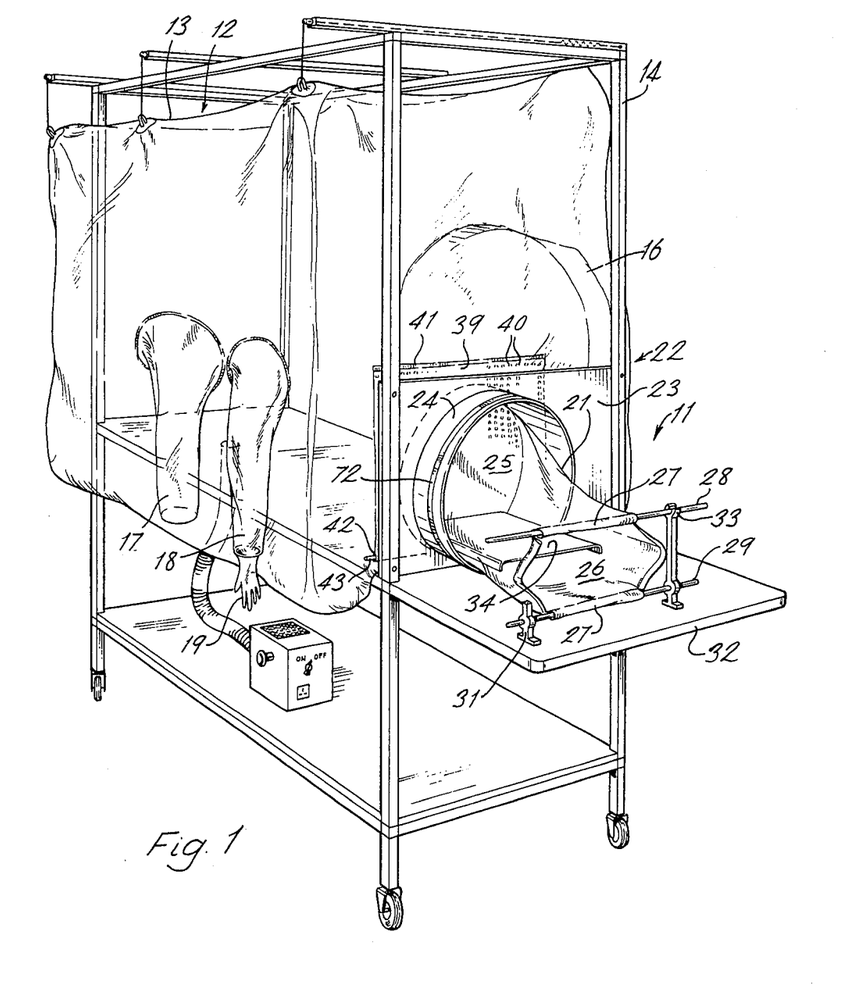
FIG. 1 is a perspective view of an enclosure member embodying the invention and adapted for use as a supply isolator.

Referring firstly to FIG. 1 there will be described an enclosure member 12 adapted for use as a supply isolator and having a transfer port indicated generally at 11. The enclosure member 12 is generally arranged as a supply isolator of conventional design, and will be referred to hereinafter as the supply isolator 12. The main envelope 13 of the supply isolator 12 is suspended from a metal frame 14 and coupled via a relatively large opening 16 to a bed isolator which is not shown. The supply isolator 12 has two flexible sleeves 17 and 18 which are either supplied with, or adapted to co-operate with, gloves 19 to allow manipulation in known manner of objects within the supply isolator 12.

The purpose of a supply isolator is to provide a transfer area in which objects needed in a main bed isolator can be assembled and can be handled through an opening into the bed isolator. The protected microbiological environment consists of the whole of the interior of the supply isolator and the whole of the interior of the bed isolator which communicates with the supply isolator. The present invention is concerned in this embodiment with the transfer port 11 which allows entry into the supply isolator 12 of objects from the ambient surroundings, without breaking the barrier of the microbiological environment within the supply isolator.

Referring now to the transfer port 11, a flexible transfer sleeve 21 is coupled to the supply isolator 12 by means of a frame 22. The frame 22 comprises a flat plate 23 fastened to the metal frame 14, and a short rigid cylinder 24 projecting outwardly from the plate 23 and inwardly towards the interior of the isolator 12. The rigid cylinder 24 defines an opening 25 communicating with the interior of the supply isolator 12. In a simple arrangement the walling of the isolator 12 may be secured for example by welding or taping to the rear of the plate 23 so that the opening 25 in the plate 23 provides direct access to the interior of the supply isolator 12. Also in such a simple arrangement the flexible sleeve 21 can be taped or otherwise securely fastened around the outside of the cylinder 24 at its outer end.

However in a preferred arrangement shown in FIGS. 1 and 1a to 1c, the supply isolator 12 is formed with an integral inner sleeve 70 which extends from the wall of the main envelope 13 of the supply isolator 12 outwardly within the cylinder 24 so as to provide a liner for the cylinder 24. The object of this arrangement is to allow the transfer sleeve 21 to be secured directly to the wall of the envelope 13 so that the metal surface of the cylinder 24 does not form part of the boundary of the isolated environment. This allows easier sterilisation. Although the transfer sleeve 21 can be attached to the isolator 12 in a number of ways, one convenient way is shown with particular reference to FIGS. 1a, 1b and 1c which Figures illustrate a number of steps in the setting up of the transfer port 11 of FIG. 1.

Figure 1A:
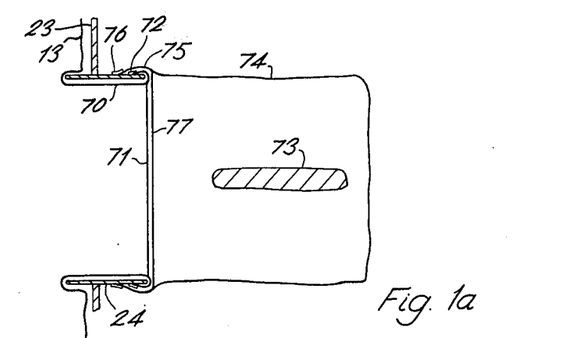
FIGS. 1a, 1b and 1c are diagrammatic cross-sections of part of the enclosure member of FIG. 1 and show one method of setting up a transfer port of the enclosure member.

Referring to FIG. 1a, the main envelope 13 of the isolator 12 is formed with the inner sleeve 70 which is arranged to form a liner along the inside of the cylinder 24 as shown. The inner sleeve 70 is closed by an integral closure sheet 71 and the inner sleeve 70 continues beyond the closure sheet 71. The outer end of the inner sleeve 70 is folded back around the outside of the cylinder 24 and securely taped thereto by adhesive tape 72. At this stage the remainder of the supply isolator 13 has already been positioned in place as shown in FIG. 1.

The transfer sleeve 21 and other attachments necessary for its setting up are brought to the supply isolator 12 in a sterile pack 73 which is encased in a bag 74 of flexible synthetic plastics material having an open ended entry sleeve 75 at one end which is arranged over the outer end of the cylinder 24 and securely taped in position thereon by adhesion tape 76. Before the entry sleeve 75 of the bag 74 is taped in position over the cylinder 24, inside of the sleeve 75, the outer face of the closure sheet 71, and the folded back portion of the inner sleeve 70 are all wiped with sterilising fluid.

Figure 1B:
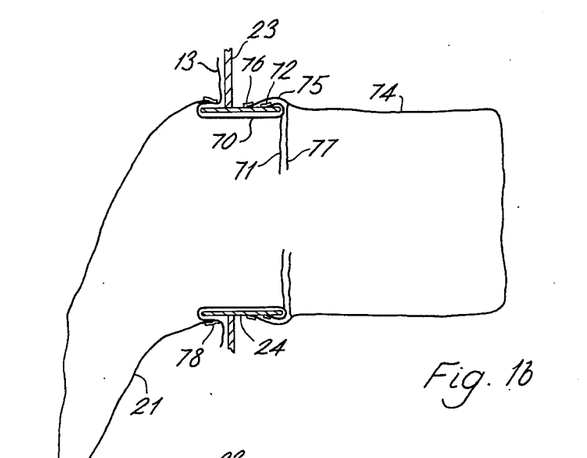
Figure 1C:
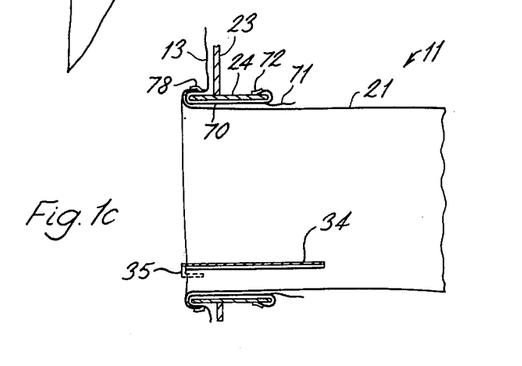

Referring to FIG. 1b, a nurse operating from within the supply isolator 12 next severs the closure sheet 71 and a corresponding closure sheet 77 of the bag 74, and the sterile pack 73 is passed through the cylinder 24 into the supply isolator 12. The transfer sleeve 21 is removed from the sterile pack 73 and is secured around the inner projecting edge of the cylinder 24 and securely taped thereto as shown at 78. Next the transfer sleeve 21 is pushed outwardly through the cylinder 24 and through the openings in the closure sheets 71 and 77 to assume the position shown in FIG. 1c. As shown in FIG. 1c the remnants of the bag 74 can be removed from the outside of the cylinder 24. Other elements of the isolator, such as a platform 34 (to be described hereinafter) may be introduced through the isolator entry port 11 and set up in position as shown in FIG. 1c.

Referring again to FIG. 1, there are provided at the outer end of the flexible sleeve 21, two loops 27 in the flexible material of the sleeve to accommodate rods 28 and 29 respectively. At this outer end the sleeve defines an opening 26, unless the sleeve is closed as will be described hereinafter.

The lower rod 29 is premanently secured to two upright members 30 and 31 which extend vertically from a horizontal table 32 projecting from the side of the steel frame 14. The upper rod 26 is shown resting on two stirrups formed at the top of the members 30 and 31, of which one stirrup 33 is shown, the other stirrup being cut away in the drawing for simplicity. In use the upper rod 28 can either be positionned as shown to leave the outer end of the sleeve 21 open, or the rod 28 can be lifted off the stirrups 33 and laid alongside the rod 29, resting on the sleeve 21, so as substantially to close the sleeve 21.

Inside the sleeve 21 is suspended a platform 34 by means of two clips which attach the platform to the cylinder 24 by one clip on each side of the cylinder. One of the clips is shown at 35 in FIG. 1c. Conveniently the platform 34 is of metal and is positioned above the floor of the sleeve 21 substantially free of contact with the sleeve 21, when the bar 28 is in its raised position. The platform 34 may be withdrawn inside the isolator 12 when not in use.

On the inner side of the frame 22 is a air permeable member comprising a curtain 39 of flexible transparent synthetic plastics material which is perforated by holes 40 to make the curtain air permeable. The curtain 39 is secured to the walling of the isolator 12 along a weld line 41. At the bottom of the curtain 39 is a loop 42 in whih is positioned a rod 43 which holds the curtain in position across the opening 25 by gravity.

The walling of the supply isolator 12, and the associated sleeves and gloves, are made of transparent flexible synthetic plastics material such as polyvinylchloride film 0.1 to 0.3 mm thick, and similar material is preferably used for the sleeve 21.

The frame 22 is conveniently made of rigid synthetic plastics material.

Considering the manner of operation of the transfer port 11, there will first be described the purpose of the sleeve 21, and secondly the purpose of the curtain 39.

Figure 2A:
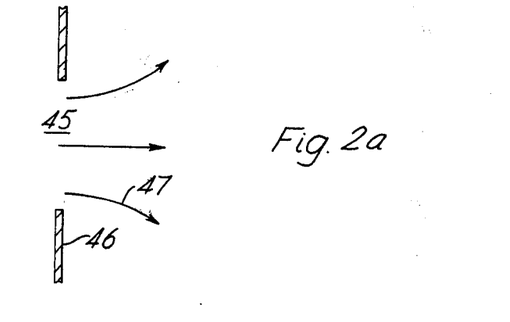
FIGS. 2a and 2b are diagrammatic representations of air flow patterns through a simple opening in a wall of a pressurised enclosure.

In FIG. 2a there is shown in diagrammatic form a typical air flow pattern 47 for air passing through a simple opening 45 in a wall 46 from a higher pressure region on the left of the wall 46 to a lower pressure region on the right. The conditions supposed are those which are aimed for in an isolator system of very much greater size than a bed isolator or a surgical isolator, for example in a clean air isolated room. The ideal conditions for such an isolated room are that there is a large air capacity in the room and there are no movements or air currents in the vicinity of the opening 45. In such circumstances the flow of air out through the opening 45 is uniform and non-turbulent and a simple opening as shown can suffice to pass articles into and out of the isolated room.

Figure 2B:
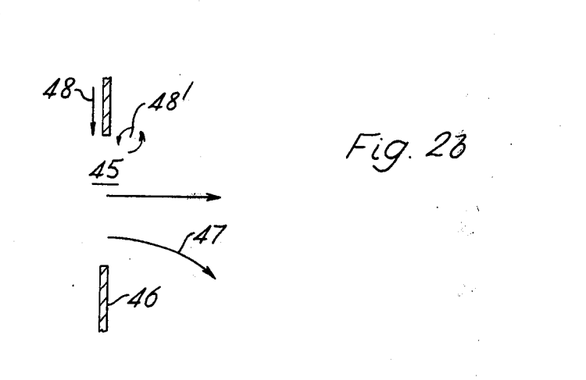

The conditions in a flexible isolator of smaller volume, such as a bed isolator or a surgical isolator, are quite different and it is inevitable that movements will be made within such an isolator in the vicinity of the opening 45 with consequent cross-currents of air. Further disturbance is caused by the need to maintain a constant inflow of air to a flexible isolator at a rate sufficient to keep the isolator inflated. Manipulation of half suits and glove arms within a flexible isolator produce more disturbance. In FIG. 2b there is shown in diagrammatic form an example of an air flow pattern which may arise from an air movement within an isolator. A cross current 48 close to a simple opening 45 in a wall 46 will typically produce a vortex 48' outside the isolator and will lead to creep of unsterilised air around the edge of the opening 45. This is particularly likely to occur during the actual movement of the articles into the conduit because such a movement, no matter how carefully performed, must create certain disturbances in the air flow. Eddy currents such as those around the edges of the opening cause contamination of the interior of the isolator and make it impossible to use a simple opening for a transfer port with a relatively small flexible isolator such as a bed isolator, a supply isolator or a surgical isolator.

Figure 2C:
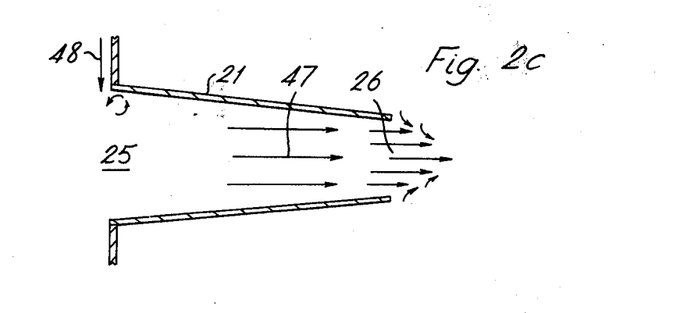
FIG. 2c is a diagrammatic representation of air flow patterns through a sleeve according to one aspect of the present invention having a diminishing cross-sectional area.

To cope with this problem there is provided in accordance with the present invention a transfer port having a sleeve leading from an opening in the isolator, and such a sleeve is shown in diagrammatic form in FIG. 2c. (In this figure the same reference numerals are used as in FIG. 1, but FIG. 2c is only diagrammatic and is not a scale section of parts of FIG. 1.) In preferred embodiments of the invention the sleeve is arranged to be of diminishing cross-sectional area and the sleeve shown in FIG. 2c is of this form. The purpose of the sleeve 21 is to produce a substantially planar non-turbulent flow in the air leaving the isolator through the opening 25. The presence of the sleeve 21 means that any vortices produced (such as is shown in FIG. 2c at 48') are straightened out in the conduit and do not have an opportunity to entrain unsterilised air back into the isolator. The purpose of the diminishing cross-sectional area of the sleeve 21 is to produce a uniformly increasing air velocity along the conduit. This assists in producing a laminar flow at the free end of the sleeve, and enables a non-turbulent flow to be achieved with a shorter length of sleeve than would be necessary with a straight sided sleeve. Where a laminar flow 47 is arranged as shown in FIG. 2c, the air entrained by the air leaving the sleeve is entrained into the outward laminar flow which forms a cone as shown. The entrained air is prevented or inhibited from forming into vortices around the edge of the opening 26.

Turning now to the purpose of the perforated curtain 39, FIG. 2c shows the flow pattern when the opening 25 is free of obstruction, which is the situation when articles are being passed through the opening 25. However, it would not be convenient for the opening 25 to remain unobstructed continuously in the case of a flexible isolator, since the isolator would tend to deflate and unclean air would creep in at the opening 25. Although the sleeve could be closed by the rods 28 and 29 alone, it has been found advantageous to provide the curtain 39.

The use of the curtain 39 allows the rods 28 and 29 to be maintained in the open position for any desired interval while a nurse unwraps a sterile object for entry into the isolator. The perforated curtain provides a cone of sterile air emerging from the opening 26, and the nurse can conveniently unwrap articles in this cone of air before entering the articles through the sleeve. In the absence of the curtain 39, such an operation would tend to deflate the isolator.

Although an air-impervious curtain would perform the task of closing off the sleeve 21, this may be unsatisfactory in that there would then be no air flow along the sleeve 21 when the curtain was in place, and unclean air would creep into the sleeve from the ambient surroundings. The continuous flow of air through the sleeve 21 provided by the perforated curtain keeps the sleeve clean and prevents creeping of unclean air into the sleeve.

Finally the perforations in the curtain 39 make it possible to dispense with a pressure control valve to regulate the pressure within the isolator. Thus the perforations in the curtain 39 also have the advantageous effect of regulating the degree of inflation of the bed isolator and the supply isolator. In operation a continuous appropriate flow of air can be supplied to the bed isolator and any excess air passes out through the perforations.

As has been mentioned, it has been found useful to arrange that the outward air of sterilised air has a velocity which increases with distance along the sleeve from the opening of the sleeve into the isolator. The main function of the rods 28 and 29 is to enable the flexible sleeve 21 to be arranged in such a manner that the cross-sectional area of the sleeve 21 diminishes with distance along the sleeve away from the opening 25. As shown, the shape of the sleeve 21 starts at the cylinder 24 as a right circular cylinder and changes to a substantially rectangular opening 26 at the outer end of the sleeve 21. This outer end is arranged to have a lesser cross-sectional area than the cylinder 24 with the result that the air flow along the sleeve 21 from the perforated curtain 39 must necessarily increase in velocity as the air flows along the sleeve 21.

By way of example only, the sleeve 21 may be in the region of 45 cm along the length of the sleeve and the opening 25 may be in the region of the same diameter. The air holes 40 may be about 2 mm in diameter and may be positioned about 1 mm apart. The air pressure in the isolator 12 may be in the region of 0.5 mm water.

The manner of operation of the transfer port shown in FIG. 1 will now be described. It is an advantage of the arrangement shown in FIG. 1 that articles can be introduced to the supply isolator 12 by one nurse rather than by two nurses co-operating as is often necessary with known devices. When the transfer port is not in operation, the rod 28 is normally in the closed position as described, resting next to the rod 29. When the nurse wishes to introduce an object into the supply isolator she lifts the rod 28 and places it on the stirrups 33. The supplies to the isolator will normally be pre-sterilised and wrapped in an outer sterilised wrapping. The nurse partially unwraps the object, inserts it into the opening 26, completes the unwrapping operation and pushes the article for transfer out of its wrapping on to the platform 34. The wrapping is removed from the opening 26 and is disposed of. The nurse then walks round to the side of the supply isolator 12 and engages the gloves on the sleeves 17 and 18. The nurse then reaches within through the opening 25 from the isolator side, lifts the object from the platform 34, and brings it back into the isolator 12. From the supply isolator 12, the object can be passed through the opening 16 into the bed isolator (not shown).

In the normal use of inflated exclusion isolators the main difficulty is found to be in introducing objects into the isolator from the outside environment without bringing in contamination. With a large scale isolator such as has been described at 12 in FIG. 1, there is less difficulty in providing for the removal of objects from the isolator by known methods. For example where the isolator is a large supply or bed isolator, an object can be removed by momentarily opening a sleeve or port to pass out the object. During passage the object is shielded by an outward stream of sterilised air and over a short time unclean air does not gain entry. For this reason it may be that although the transfer port shown in FIG. 1 can be used for removal of objects from the isolator 12, its main use will normally be for the entry of objects.

However when a transfer port according to the invention is used with a smaller isolator such as a surgical isolator, it will normally find use for entry and exit of objects from the surgical isolator. The reason for this is that it is not usually possible to remove objects from a surgical isolator by the method described above of momentarily a port or sleeve, because the size of the surgical isolator will not sustain a sudden loss of air without deflating. The loss of air by momentary movement of the air permeable curtain 39 does not cause such a great loss of air as the opening of a sleeve or port by conventional methods.

In some arrangements the rods 28 and 29 may be replaced by more sophisticated closure means, such as a foot operated closure means which automatically opens and shuts the sleeve 21 when required. Unless a separate pressure valve is provided on the isolator, it will normally be required that the sleeve 21 is never tightly closed, so as to allow some escape of air.

Figure 3:
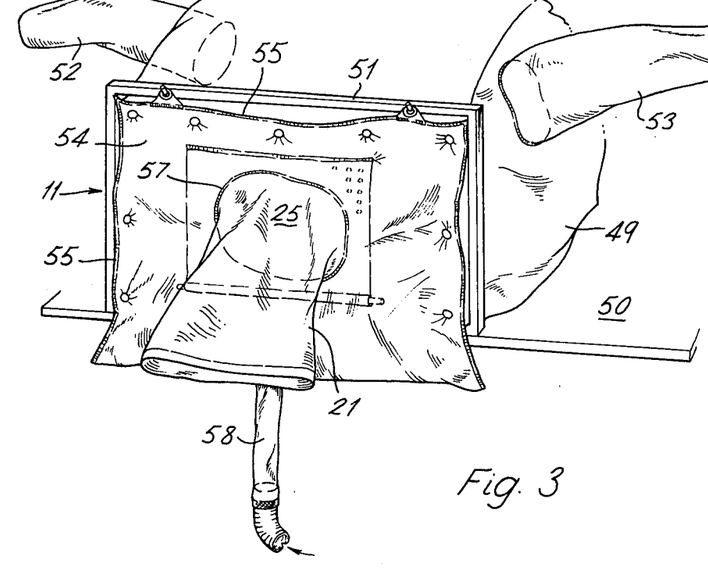
FIG. 3 is a perspective view of a second embodiment of the invention in which a transfer port according to the invention forms part of a surgical isolator.
Figure 4:
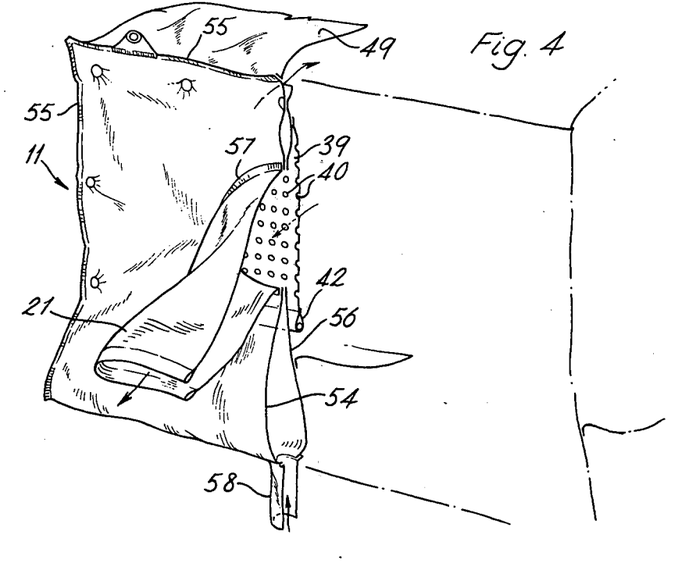
FIG. 4 is a cut-away drawing of part of the transfer port shown in FIG. 3.
Figure 5:
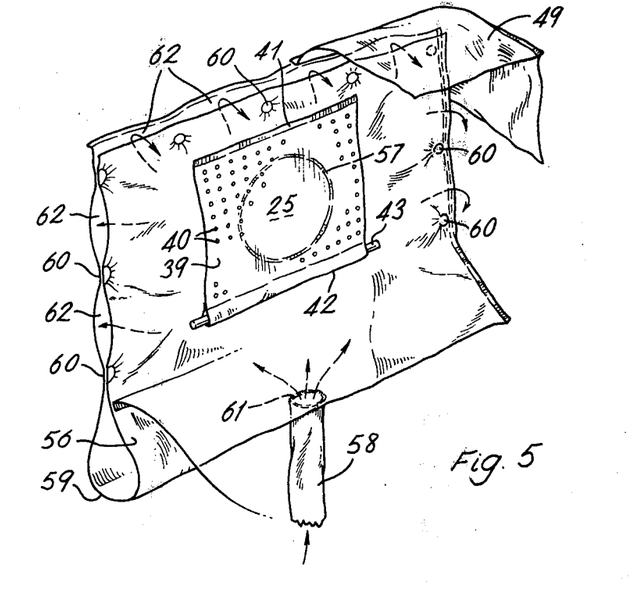
FIG. 5 is a partly cut-away drawing of the transfer port shown in FIG. 3 and 4 as viewed from the interior of the surgical isolator.

Turning now to FIGS. 3, 4 and 5 there will be described a further embodiment of the invention in which a transfer port according to the invention is shown attached to a surgical isolator. A surgical isolator is conventionally a self-supporting disposable isolator comprising a flexible envelope of transport synthetic plastics material which is self-supporting by being inflated. The isolator is normally attached to the portion of the patient's body to be operated on, for example by adhesive, and the incision to the operating area is made through the base of the isolator and the patient's skin at one place.

Referring firstly to FIG. 3, an enclosure member 49, adapted for use as a surgical isolator and hereinafter referred to as an isolator 49 is shown with one end resting upon a table 50 which supports a vertical framework 51. The isolator enclosure member 49 has a number of sleeves of which two sleeves 52 and 53 are shown. These are shown without gloves, but gloves are normally attached in operation.

Supported by the framework 51 is a transfer port 11 which is formed integrally with the isolator 49. The transfer port 11 comprises an outer wall 54 which constitutes an end wall of the isolator 49 and is joined to the main body of the isolator 49 along weld lines 55. The transfer port 11 also comprises a flexible conduit 21 which is secured to the isolator 49 around an opening 25 in the end wall 54. (The opening 25 is also formed in an inner wall 56 not shown in FIG. 4 but to be described hereinafter with reference to FIGS. 4 and 5.) The conduit 21 is secured to the isolator 49 at the weld line 57. The isolator 49 is inflated through an inlet pipe 58.

Referring now to FIGS. 4 and 5, the transfer port 11 has an inner wall 56 which is integral with the outer wall 54 at a fold 59 at its base. At the top and sides of the inner wall 56, the wall is spaced from the outer wall 55 and free from that wall except at a series of spot welds 60. The inlet pipe 58 communicates with the surgical isolator 49 through an opening 61 in the fold 59. The air entering through the pipe 58 then inflates the inner and outer walls in the area of the fold 59 forming in effect a plenum chamber, and also separates the inner and outer walls 55 and 56 around the opening 25. The air finds its way into the isolator proper through a series of openings 62 which arise between the spot welds 60. The purpose of this arrangement is to reduce turbulence at the input of air to the surgical isolator 49.

The inner and outer walls 54 and 56 are also joined together at the weld line 57 in the shape of a circle around the opening 25, which extends through both the inner and outer walls 54 and 56.

Secured to the inner wall 56 at a weld line 64 is an air permeable member constituted by a hanging perforated curtain 39 which is perforated by holes 40. The curtain 39 is held in place by gravity by a rod 43 held in a loop 42.

Referring again to FIG. 3, the sleeve 21 is, as in the embodiment of FIG. 1, arranged to have a diminishing cross-sectional area with increase of the distance along the conduit from the opening 25. This may be arranged by rods as in FIG. 1 or merely by allowing the sleeve 21 to lie flat or nearly flat. Once again, as in the embodiment of FIG. 1, a non-turbulent stream of air is provided along the sleeve 21 by the air flow through the perforations 40 in the curtain 39. The diminishing cross-sectional area of the sleeve 21 produces an increasing air velocity along the sleeve with the desired result of reducing the possibility of contaminated air being drawn back into the sleeve 21.

In operation objects can be passed into the surgical isolator 49 in much the same manner as has been described with reference to FIG. 1, except that two nurses are required to co-operate in passing the articles due to the absence of the platform 34 in the surgical isolator transfer port of FIG. 3.

The apparatus of FIGS. 3, 4 and 5 is particularly useful in providing a method of introducing into a surgical isolator sterile supplies such as the sterile surgical instrument pack which is commonly available in operating theatres. This pack consists of a tray of cardboard, metal or plastic, containing the instruments to be used and surrounded by one or more wraps of paper or cloth.

The air emerging from the transfer port provides a cone of sterile air in which the outer wrap of the sterile package can be partially removed by the circulating nurse. The scrub nurse, using the gloves and sleeves which are continuous with the wall of the isolator enclosure, reaches through the opening 25 from the inside of the isolator and grasps the sterile end of the package, the non-sterile end of the package being held by the circulating nurse whose arms and hands are pushed into the sleeve 21 from the end outside the isolator. The scrub nurse reaching into the sleeve from the isolator end then introduces the sterile package into the isolator while the circulating nurse removes the outer protecting wrap from the sleeve.

Figure 6:
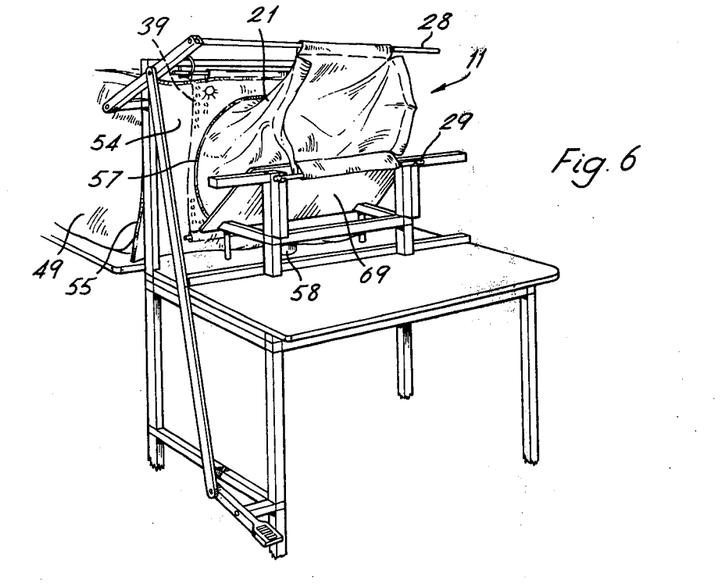
FIG. 6 is a perspective view showing one arrangement for positioning the sleeve of the transfer port shown in FIGS. 3, 4 and 5.

In FIG. 6 there is shown in section one arrangement for positioning the sleeve 21 of the embodiment of FIG. 3, 4 and 5, in which the sleeve 21 is inclined to the horizontal with its free end held at rods 28 and 29 at a higher level than the opening 25 in the isolator. Many articles required in the isolator can conveniently be dropped into the inclined sleeve 21 and be allowed to roll down into the isolator without damage. A platform 69 is provided outside the sleeve 21 to facilitate such rolling. This method allows a nurse to introduce objects into the isolator without assistance. The rods 28 and 29 can be opened and closed by a foot operated mechanism as shown.

In the embodiments where the sleeve 21 is supported by rods, it is desirable to maintain the sleeve 21 fairly taut, as any sagging portions can introduce turbulent currents in the air flow along the sleeve.

In the embodiments of FIGS. 3 to 6 the entire transfer port is disposable and forms part of the isolator for sterilisation purposes. The isolator and sleeve may be sterilised for example by gamma-radiaton.

By way of example of dimensions which may be used in the surgical isolator described with reference to FIGS. 3 to 6, the isolator may be for example 240 cms in length and 90 cms in diameter. The isolator may be supplied with clean air by a blower which is driven by a ½-horse-power or less electric motor and which supplies air at 3.2 m$^3$/min at a pressure of 8.0 cms of water. The air may be filtered by an ultra-high efficiency type filter measuring for example 30 cms by 30 cms by 15 cms. In such a surgical isolator the diameter of the openings in the enclosure member communicating with the transfer port may be in the region of 40 cms though diameters as small as 20 cms or less may be used, and the length of the sleeve may be generally the same length as the diameter of the opening. In the case of a supply isolator such as has been described with reference to FIG. 1, the size of the opening may be larger, for example having a diameter in the region of 40 to 50 cms and again the length of the sleeve may be in the same range. In general the sleeve needs to be long enough to be closed when objects are not being passed through the transfer port, and or a length not greater than that convenient for passing objects.

By way of example of ranges of dimensions which may conveniently be used, the following ranges are given. The area of the opening in the enclosure member may be in the range 300 cm$^2$ to 2000 cm$^2$, and the length of the sleeve may be in the range 20 cm to 50 cm. The perforations in the air permeable member may be arranged in a regular pattern, each perforation having an average width in the range 0.5 mm to 10 mm and an average spacing from the next adjacent perforation in the range of one half to five times the average width. Preferably the area of the opening in the enclosure member is in the range 1000 cms$^2$ to 2000 cm$^2$, and the length of the sleeve is in the range 40 cm to 50 cm, each perforation having an average width in the range 1 mm to 3 mm and an average spacing from the next adjacent perforation in the range of one half to one times the average width. Air supply means may supply clean air to the enclosure member at a pressure and rate sufficient to maintain the enclosure member at a pressure in the range of 0.2 to 1 mm of water.

One criterion which may be used to give a practical guide to the dimensions of the transfer port is that the air leaving the external end of the sleeve should have an exit velocity of about 30 meters per minute. A greater velocity may be used but normally the minimum safe pressure in the enclosure member will be selected, provided it is sufficient to maintain the required exit velocity to avoid turbulence or instability de' 'oping in the air stream in the sleeve. One preferred range of the exit velocity of the air leaving the sleeve is the range of 20 to 60 meters per minute. A more preferred range is the rang of 25 to 35 meters per minute.

We claim:

1. An enclosure apparatus for providing an environment isolated from the ambient environment, said enclosure apparatus comprising;

an enclosure member for providing an environment isolated from the ambient environment and at a higher pressure than the ambient environment, said enclosure member having an opening for passage of objects into and out of the enclosure member;

a flexible sleeve, one end of said sleeve being coupled to the enclosure member around said opening and the other end of said sleeve being for positioning externally of the enclosure member; and air permeable member means positioned across said opening in the enclosure member for passing a restricted substantially non-turbulent flow of air along the sleeve when the interior of the enclosure member is maintained at a higher pressure than the ambient environment, said air permeable member means being movable away from the opening in the enclosure member for passage of objects along the sleeve into and out of the enclosure member.

2. An enclosure member according to claim 1 including support means for supporting the flexible sleeve with the cross-sectional area of the sleeve diminishing with increase of distance along the sleeve away from the opening of the enclosure member throughout the entire length of the sleeve, the diminishing cross-sectional area of the sleeve producing an increasing air velocity along the sleeve which acts to prevent or inhibit entrainment of air back into the sleeve.

3. An enclosure member according to claim 1 in which the air permeable member means comprises a sheet of flexible material hanging in the form of a curtain across the opening.

4. An enclosure member according to claim 1 in which the air permeable member means comprises a sheet of flexible synthetic plastics material which is itself substantially impervious to air but which is perforated to render it air permeable.

5. An enclosure member according to claim 4 in which the perforations are arranged in a regular pattern, each perforation having an average width in the range 0.5 mm to 10 mm and an average spacing from the next adjacent perforation in the range of one half to five times the average width.

6. An enclosure member according to claim 5 in which each of the said perforations has an average width in the range 1 mm to 3 mm and an average spacing from the next adjacent perforation in the range of one half to one times the average width.

7. An enclosure member according to claim 6 together with air supply means arranged to supply to the enclosure member clean air at a pressure and rate sufficient to maintain the enclosure member at a pressure in the range of 0.2 to 1 mm water.

8. An enclosure member according to claim 1 in which the transfer port includes means for arranging the end of the sleeve remote from the enclosure member in at least two positions, a first of which is such that the end of the sleeve is held open for passage of objects, and a second of which is such that the end of the sleeve is substantially closed.

9. An enclosure member according to claim 1 including means for varying the cross-sectional area of the end of the flexible sleeve remote from the enclosure member so as to allow variation in the rate of loss of air from the enclosure member.

10. An enclosure member according to claim 1 in which there is provided within the flexible sleeve a rigid platform which is supported generally clear of the walls of the sleeve, the platform being such that articles being passed through the sleeve may be placed on the platform from one end of the sleeve and may be removed from the platform from the other end of the sleeve.

11. An enclosure member according to claim 1 in which the enclosure member is a flexible walled enclosure member adapted to be inflated in use.

12. An enclosure member according to claim 11 in which the enclosure member and the sleeve are made of flexible synthetic plastics material.

13. An enclosure member according to claim 12 including a rigid frame defining the form of the said opening in the enclosure member and supporting the sleeve at the end thereof coupled to the enclosure member.

14. An enclosure member according to claim 1 together with air supply means arranged to supply to the enclosure member clean air at a pressure and rate such that the exit velocity of air leaving the end of the sleeve remote from the enclosure member, when that end is in an open position for passage of objects through the sleeve, is in the range 20 to 60 meters per minute.

15. An enclosure member according to claim 1 together with air supply means arranged to supply to the enclosure member clean air at a pressure and rate such that the exit velocity of air leaving the end of the sleeve remote from the enclosure member, when that end is in an open position for passage of objects through the sleeve, is in the range 25 to 35 meters per minute.

* * * * *